United States Patent
Koba et al.

(10) Patent No.: US 9,692,088 B2
(45) Date of Patent: Jun. 27, 2017

(54) METHOD FOR RESTORING BATTERY CAPACITY, METHOD FOR RESTORING BATTERY PACK CAPACITY, DEVICE FOR RESTORING BATTERY CAPACITY, AND DEVICE FOR RESTORING BATTERY PACK CAPACITY

(71) Applicants: PRIMEARTH EV ENERGY CO., LTD., Kosai-shi, Shizuoka (JP); TOYOTA JIDOSHA KABUSHIKI KAISHA, Toyota-shi, Aichi (JP)

(72) Inventors: Daisuke Koba, Toyohashi (JP); Sachio Takeda, Toyohashi (JP); Koichi Ichikawa, Kasugai (JP); Yasuhiro Takahashi, Miyoshi (JP); Masahiko Mitsui, Toyota (JP)

(73) Assignees: PRIMEARTH EV ENERGY CO., LTD, Kosai (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 58 days.

(21) Appl. No.: 14/432,836

(22) PCT Filed: Mar. 19, 2014

(86) PCT No.: PCT/JP2014/057610
§ 371 (c)(1),
(2) Date: Apr. 1, 2015

(87) PCT Pub. No.: WO2014/167971
PCT Pub. Date: Oct. 16, 2014

(65) Prior Publication Data
US 2016/0020495 A1    Jan. 21, 2016

(30) Foreign Application Priority Data

Apr. 12, 2013    (JP) ................. 2013-084246

(51) Int. Cl.
H02J 7/04    (2006.01)
H02J 7/16    (2006.01)
(Continued)

(52) U.S. Cl.
CPC ......... H01M 10/4242 (2013.01); H01M 2/12 (2013.01); H01M 10/345 (2013.01);
(Continued)

(58) Field of Classification Search
USPC .......................................................... 320/148
See application file for complete search history.

(56) References Cited

U.S. PATENT DOCUMENTS 6,163,131 A * 12/2000 Gartstein ............... H02J 7/025
                                                        320/118
6,281,663 B1 * 8/2001 Yagi .................... B60L 11/1816
                                                        320/150
(Continued)

FOREIGN PATENT DOCUMENTS

JP    H04-61756 A    2/1992
JP    2000-340254 A    12/2000
(Continued)

Primary Examiner — Samuel Berhanu
(74) Attorney, Agent, or Firm — Oliff PLC

(57) ABSTRACT

This method for restoring battery capacity is provided with an oxygen-generating/exhausting step for charging a nickel-metal-hydride storage battery, causing the generation of oxygen gas in a positive electrode, opening a safety valve device, and discharging at least a portion of the oxygen gas through the safety valve device to the outside of the battery. The battery temperature when starting the step is in the range of −30 to 10° C. and the SOC is in the range of (30-Ta) to 100%, or the battery temperature (Ta) is in the range of 10 to 50° C. and the SOC is in the range of 20-100%.

8 Claims, 11 Drawing Sheets

(51) Int. Cl.
  *H01M 10/42* (2006.01)
  *H01M 2/12* (2006.01)
  *H01M 10/34* (2006.01)
  *H01M 10/44* (2006.01)
  *H02J 7/00* (2006.01)

(52) U.S. Cl.
  CPC ............ *H01M 10/44* (2013.01); *H02J 7/007* (2013.01); *H02J 7/0052* (2013.01); *Y02E 60/124* (2013.01)

(56) References Cited

U.S. PATENT DOCUMENTS

| | | | | |
|---|---|---|---|---|
| 2002/0138971 A1* | 10/2002 | Onishi | ............... | H01M 2/0277 29/623.1 |
| 2002/0182496 A1* | 12/2002 | Morishita | ............. | H01M 4/242 429/218.2 |
| 2003/0140483 A1* | 7/2003 | Wakabayashi | ........ | H01M 4/244 29/623.1 |
| 2004/0053114 A1* | 3/2004 | Furukawa | ............. | H01M 4/366 429/50 |
| 2004/0191619 A1* | 9/2004 | Komori | ............... | H01M 2/0262 429/176 |
| 2005/0026032 A1 | 2/2005 | Morishita et al. | | |
| 2010/0047673 A1* | 2/2010 | Hirakawa | ............. | H01M 2/105 429/54 |
| 2012/0041622 A1* | 2/2012 | Hermann | ............ | H01M 16/006 701/22 |
| 2013/0122372 A1* | 5/2013 | Kagei | ................... | H01M 4/505 429/221 |
| 2015/0008364 A1* | 1/2015 | Endo | .................... | H01M 4/505 252/182.1 |

FOREIGN PATENT DOCUMENTS

| | | |
|---|---|---|
| JP | 2002-313432 A | 10/2002 |
| JP | 2004-319366 A | 11/2004 |
| JP | 2008-235036 A | 10/2008 |
| JP | 2013-020817 A | 1/2013 |

\* cited by examiner

METHOD FOR RESTORING BATTERY CAPACITY, METHOD FOR RESTORING BATTERY PACK CAPACITY, DEVICE FOR RESTORING BATTERY CAPACITY, AND DEVICE FOR RESTORING BATTERY PACK CAPACITY

CROSS REFERENCE TO RELATED APPLICATIONS

This is a US national phase application based on the PCT International Patent Application No. PCT/JP2014/057610 filed on Mar. 19, 2014, and claiming the priority of Japanese Patent Application No. 2013-084246 filed on Apr. 12, 2013, the entire contents of which are herewith incorporated by reference.

TECHNICAL FIELD

The present invention relates to a battery capacity restoring method, a battery-pack capacity restoring method, a battery capacity restoring device, and a battery-pack capacity restoring device for a nickel-hydride storage battery including a positive electrode, a negative electrode, a turn-back safety valve device, and an aqueous electrolyte to increase a discharge capacity of the negative electrode of the battery.

BACKGROUND ART

A nickel-hydride storage battery (hereinafter, also simply referred to as a battery) is generally configured such that a capacity of a negative electrode is set larger than a capacity of a positive electrode, so that a battery capacity is limited by the positive capacity (hereinafter, also referred to as positive electrode limitation). With this positive electrode limitation, it is possible to restrain an increase in internal pressure of a battery during overcharge and during overdischarge. It is to be noted that, by comparison between the negative electrode and the positive electrode, an excessive uncharged portion available for charge is referred to as "charge reserve" and an excessive charge portion available for discharge is referred to as "discharge reserve".

Meanwhile, recent searches have revealed that some of nickel-hydride storage batteries allow a slight amount of hydrogen gas to continuously permeate through a battery case and leak to the outside of a battery. When the hydrogen gas leaks out of the battery, accordingly, hydrogen is released from hydrogen absorbing alloy of a negative electrode according to a hydrogen leakage amount in order to keep balance of hydrogen partial pressure in the battery case. Accordingly, a discharge reserve capacity of the negative electrode decreases. This hydrogen leakage advances very slowly and thus will not cause any trouble for a relatively short use period.

However, long-term use will cause deterioration in capacity balance between the positive electrode and the negative electrode and decrease the capacity of the negative electrode, causing a discharge reserve capacity of the negative electrode to run out. As a result, the nickel-hydride storage battery is subjected to negative electrode limitation (representing that a discharge capacity of a battery is limited by a negative electrode capacity), thus decreasing the battery capacity and resulting in large lowering of battery characteristics. In a case where a nickel-hydride storage battery is used as a power source for an electric vehicle, a hybrid vehicle, or the like, a long-term life is demanded and therefore this lowering of battery characteristics would be problematic.

To solve the above problems, there has been proposed a method for reproducing a nickel-hydride storage battery with a lowered battery capacity due to a decrease in the discharge capacity of the negative electrode by increasing (restoring) the discharge capacity of the negative electrode (see Patent Document 1). When the nickel-hydride storage battery is overcharged, electrons are released from the positive electrode and also oxygen gas is generated from hydroxide ions in the aqueous electrolyte. In the negative electrode, on the other hand, hydrogen generated by water decomposition is absorbed by the hydrogen absorbing alloy. However, oxygen gas generated from the positive electrode is normally consumed by reaction with the hydrogen absorbed by the hydrogen absorbing alloy (water is generated) (this action is also referred to as recombination reaction). Ultimately, it is impossible to increase the amount of hydrogen to be absorbed by the hydrogen absorbing alloy of the negative electrode by simply overcharging the battery.

In Patent Document 1, in contrast, the safety valve device is valve-opened in advance, and at least part of the oxygen gas generated from the positive electrode due to overcharge of the nickel-hydride storage battery is released out of the battery through the valve-opened safety valve device. Accordingly, in the battery, the hydrogen absorbed by the hydrogen absorbing alloy of the negative electrode in association with overcharge excessively increases relative to the oxygen gas. As a result, at least part of the hydrogen absorbed by the hydrogen absorbing alloy of the negative electrode by overcharge can be left as being absorbed in the hydrogen absorbing alloy without reacting with the generated oxygen gas (i.e., the discharge capacity of the negative electrode can be increased). This can restore the discharge capacity of the negative electrode.

RELATED ART DOCUMENTS

Patent Documents

Patent Document 1: JP-A-2008-235036

SUMMARY OF INVENTION

Problems to be Solved by the Invention

However, when the battery starts to be charged from an overcharged state, that is, a state with an SOC of more than 100% as in Patent Document 1 to restore the discharge capacity of the negative electrode, overcharge has to be performed deeply in order to sufficiently increase the discharge capacity. This leads to large damages to the nickel-hydride storage battery.

On the other hand, when the battery starts to be charged from a state with a low SOC to restore the negative electrode discharge capacity, the following problems occur. Specifically, when charging is started from the low SOC state, the reaction that generates oxygen gas from hydroxide ions in the positive electrode, concretely, the reaction expressed by $OH^- \rightarrow 1/4 O_2 + 1/2 H_2O + e^-$ does not occur or hardly occurs. Thus, the oxygen gas is not generated or is slightly generated in the positive electrode by charging. Further, the reaction that generates hydrogen by water decomposition in the negative electrode, concretely, the reaction expressed by $M + H_2O + e^- \rightarrow MH + OH^-$ (where "M" denotes hydrogen absorbing alloy) does not occur or hardly occurs. Thus, the hydrogen is not absorbed or is slightly absorbed by the hydrogen absorbing alloy of the negative electrode by charging. On the other hand, part of the hydrogen absorbed in the hydrogen absorbing alloy of the negative electrode turns into hydrogen gas and is exhausted or ejected out of the battery through the valve-opened safety valve device. Therefore, while the SOC is low, the negative discharge capacity is apt to decrease even though charging is being performed. This causes a deterioration in restoring efficiency of the negative electrode discharge capacity.

The present invention has been made in view of the circumstances and has a purpose to provide a battery capacity restoring method, a battery-pack capacity restoring method, whereby enabling eliminating or reducing damages due to overcharge to the nickel-hydride storage battery and efficiently restoring the negative electrode discharge capacity, and, a battery capacity restoring device suitable for restoring a negative electrode discharge capacity, and a battery-pack capacity restoring device.

Means of Solving the Problems

The inventors found that restoration of a negative electrode discharge capacity is started after oxygen gas generated from a positive electrode is released out of a battery, that is, after valve-opening of a safety valve device, and the restoration efficiency varies according to a valve-opening situation. To achieve the above purpose, one aspect of the invention provides a method for restoring a battery capacity of a nickel-hydride storage battery including a positive electrode, a negative electrode, a turn-back type safety valve device, an aqueous electrolyte by increasing a discharge capacity of the negative electrode, the method including: an oxygen generating and exhausting step of charging the nickel-hydride storage battery to generate oxygen gas from the aqueous electrolyte in the positive electrode and bringing the safety valve device in a valve-open state to release at least part of the generated oxygen gas out of the battery through the safety valve device, wherein a battery temperature Ta at start of the oxygen generating and exhausting step is in a range of −30 to 10° C. and an SOC at the start is in a range of (30-Ta) to 100%, or, the battery temperature Ta at the start is in a range of 10 to 50° C. and the SOC is in a range of 20 to 100%.

In this battery capacity restoring method, the range of the battery temperature Ta and the range of the SOC at the start of the oxygen generating and exhausting step are specified, and the oxygen generating and exhausting step is performed from a certain value within the ranges to increase the positive discharge capacity. Since the oxygen generating and exhausting step is started from a state where the SOC is 100% or less to restore the negative electrode discharge capacity, an SOC value obtained when the negative electrode discharge capacity is increased to a target value can also be lowered. This can eliminate or reduce damages to the nickel-hydride storage battery due to overcharge.

On the other hand, in the range where the battery temperature Ta is −30 to 10° C., the oxygen generating and exhausting step is started in a range of SOC=(30-Ta) % or more. Alternatively, in the range where the battery temperature Ta is 10 to 50° C., the oxygen generating and exhausting step is started in a range of SOC 20% or more. After the start, accordingly, it is possible to reliably generate oxygen gas in the positive electrode and make the hydrogen absorbing alloy of the negative electrode absorb hydrogen. Accordingly, when charging is started in this range and the oxygen gas generated is released out of the battery by the safety valve device placed in a valve-open state (continued to be valve-opened), it is possible to restrain recombination reaction and make hydrogen to be absorbed in the hydrogen absorbing alloy of the negative electrode, thereby achieving efficient restoration of the negative electrode discharge capacity.

It is to be noted that the "nickel-hydride storage battery" may include an electric cell having one electrode body encased in a battery case and besides a battery module having a plurality of electrode bodies encased in one battery case separated by partition walls and connected to each other (in series or in parallel). It is to be noted that the "SOC (State Of Charge)" represents a charge amount in an initial capacity in shipping.

The "battery temperature" has only to be measured by a temperature sensor such as a thermistor attached to the battery. The "safety valve device" is a turn-back or recovery type configured to valve-open when a battery internal pressure reaches a predetermined valve-opening pressure and valve-close when the battery internal pressure decreases below the valve-opening pressure. Furthermore, for instance, the safety valve device may be configured such that a safety valve is movable in the valve-opening direction by action from outside the battery. In this safety valve device allowing the safety valve to move in a valve-opening direction by action from outside the battery, valve-opening and valve-closing can be carried out at desired timing irrespective of the battery internal pressure. Further, at least the pressure of a surrounding area of the safety valve device of the battery case may also be reduced to adjust the valve-opening timing (thus, start time).

Moreover, in the above-described battery capacity restoring method, preferably, the battery temperature Ta at the start of the oxygen generating and exhausting step is in the range of −30 to 10° C. and the SOC at the start is in a range of (40-Ta) to 100%, or, the battery temperature Ta at the start is in the range of 10 to 50° C. and the SOC at the start is in a range of 30 to 100%.

When the oxygen generating and exhausting step is started within the above ranges of the battery temperature Ta and the SOC, it is possible to more efficiently generate oxygen gas in the positive electrode by charging after the start and also increase the amount of hydrogen to be absorbed by the hydrogen absorbing alloy of the negative electrode. Thus, when charging is started within the above ranges and the safety valve device is placed in a valve-open state to release the generated oxygen gas out of the battery, more hydrogen can be absorbed by the hydrogen absorbing alloy of the negative electrode. This can more efficiently restore the negative electrode discharge capacity.

Another aspect of the invention provides a method for restoring a battery-pack capacity of a battery pack including a plurality of the nickel-hydride storage batteries by performing either one of the above-described battery capacity restoring methods on each of the nickel-hydride storage batteries, wherein the oxygen generating and exhausting step is performed while at least either cooling one or multiple nickel-hydride storage batteries placed in a central region, out of the plurality of nickel-hydride storage batteries constituting the battery pack, or heating one or multiple nickel-hydride storage batteries placed in outer regions, out of the plurality of nickel-hydride storage batteries constituting the battery pack.

Of the nickel-hydride storage batteries constituting the battery pack, one(s) placed in the central region is less likely to dissipate heat, while one(s) placed in the outer regions is more likely to dissipate heat. This causes variation in battery temperature between the nickel-hydride storage batteries in the battery pack. This variation in battery temperature is not preferable because it leads to a difference in restoring amount of negative electrode discharge capacity between the nickel-hydride storage batteries even when nickel-hydride storage batteries are started to be charged and valve-opened at the same timing as each other. Further, if the battery temperature is too high, the nickel-hydride storage battery(s) may be damaged by heat.

The battery-pack capacity restoring method includes at least either cooling one or multiple nickel-hydride storage batteries placed in the central region out of the plurality of nickel-hydride storage batteries constituting the battery pack or heating one or multiple nickel-hydride storage batteries placed in the outer regions to restore the negative electrode discharge capacity. This method can suppress variation in battery temperature between the nickel-hydride storage batteries, thereby enabling variation in restoring amount of the negative electrode discharge capacity between the nickel-hydride storage batteries. It is further possible to prevent damages to the nickel-hydride storage batteries due to high temperature.

Still another aspect of the invention provides a device for restoring a battery capacity of a nickel-hydride storage battery including a positive electrode, a negative electrode, a turn-back type safety valve device, and an aqueous electrolyte by increasing a discharge capacity of the negative electrode, the device including: a charge part configured to charge the nickel-hydride storage battery to generate oxygen gas from the aqueous electrolyte in the positive electrode; a valve opening part configured to valve-open the safety valve device of the nickel-hydride storage battery; a temperature detecting part configured to detect a battery temperature Ta of the nickel-hydride storage battery; a SOC measuring part configured to measure SOC of the nickel-hydride storage battery; and a controller configured to control charging by the charge part and valve-opening by the valve opening part based on the battery temperature and the SOC of the nickel-hydride storage battery, wherein the controller is configured to cause the charge part to charge the nickel-hydride storage battery and cause the valve opening part to bring the safety valve device in a valve-open state under a starting condition that the battery temperature Ta detected by the temperature detecting part is in a range of −30 to 10° C. and the SOC measured by the SOC measuring part is in a range of (30-Ta), or, cause the charge part to charge the nickel-hydride storage battery and cause the valve opening part to bring the safety valve device in a valve-open state under a starting condition that the battery temperature Ta is in a range of 10 to 50° C. and the SOC is in a range of 20 to 100%.

The above battery capacity restoring device includes the charge part, the valve opening part, the temperature detecting part, the SOC measuring part, and the controller as mentioned above. The controller is configured to cause the charge part to charge the nickel-hydride storage battery and the valve opening part to bring the safety valve device in the valve-open state to increase the discharge capacity of the negative electrode under the starting condition that the battery temperature Ta is within the aforementioned range and the SOC is within the aforementioned range. This battery capacity restoring device is operative to start charging and valve-opening from the state with SOC of 100% or less to restore the negative electrode discharge capacity. This can also lower an SOC value determined when the negative electrode discharge capacity is increased to a target value and eliminate or reduce damages to the nickel-hydride storage battery due to overcharge.

On the other hand, in the range of the battery temperature Ta being −30 to 10° C., charging and valve-opening are started within the range of SOC=(30-Ta) % or more. Alternatively, in the range of the battery temperature Ta being 10 to 50° C., charging and valve-opening are started within the range of SOC being 20% or more. It is therefore possible to reliably generate oxygen gas in the positive electrode after the start of the charging and the valve-opening and also make the hydrogen absorbing alloy of the negative electrode absorb hydrogen. Accordingly, by starting charge in this range and also bringing the safety valve device into the valve-open state to release the generated oxygen gas out of the battery, it is possible to restrain the recombination reaction and make the hydrogen absorbing alloy of the negative electrode absorb hydrogen, thereby performing efficient restoration of the negative electrode discharge capacity.

Furthermore, the above battery capacity restoring device, preferably, the controller is configured to cause the charge part to charge the nickel-hydride storage battery and cause the valve opening part to bring the safety valve device in the valve-open state under a starting condition that the battery temperature Ta is in the range of −30 to 10° C. and the SOC is in a range of (40-Ta) to 100%, or, cause the charge part to charge the nickel-hydride storage battery and cause the valve opening part to bring the safety valve device in the valve-open state under a starting condition that the battery temperature Ta is in the range of 10 to 50° C. and the SOC is in a range of 30 to 100%.

When both charging of the battery and valve-opening of the safety valve device are started within the aforementioned battery temperature Ta and SOC ranges, the positive electrode can more efficiently generate oxygen gas by charging after the start of charging and valve-opening, thereby increasing an amount of hydrogen to be absorbed by the hydrogen absorbing alloy of the negative electrode. Accordingly, when the charging is started within this range and also the safety valve device is placed in the valve-open state to release the generated oxygen gas out of the battery, more hydrogen can be absorbed by the hydrogen absorbing alloy of the negative electrode, thereby enabling performing more efficient restoration of the negative electrode discharge capacity.

Furthermore, another aspect of the invention provides a device for restoring a battery-pack capacity of a battery pack including a plurality of the nickel-hydride storage batteries by increasing a discharge capacity of the negative electrode of each of the nickel-hydride storage batteries, the device including: one of the above-mentioned battery capacity restoring devices; and at least one of a cooling device for cooling one or multiple nickel-hydride storage batteries placed in a central region, out of the plurality of nickel-hydride storage batteries constituting the battery pack and a heating device for heating one or multiple nickel-hydride storage batteries placed in outer regions, out of the plurality of nickel-hydride storage batteries constituting the battery pack.

This device for restoring a battery-pack capacity includes at least either the cooling device or the heating device as mentioned above in addition to the aforementioned battery capacity restoring device. Therefore, this device can restore the discharge capacity of the negative electrode by at least either cooling one or multiple nickel-hydride storage batteries placed in the central region and heating one or multiple batteries placed in the outer regions. This can restrain variation in battery temperature between the nickel-hydride storage batteries, thereby preventing variation in restoring amount of negative electrode discharge capacity between the nickel-hydride storage batteries. This can also prevent damages to the nickel-hydride storage batteries due to high temperature.

MODE FOR CARRYING OUT THE INVENTION

First Embodiment

Figure 1:
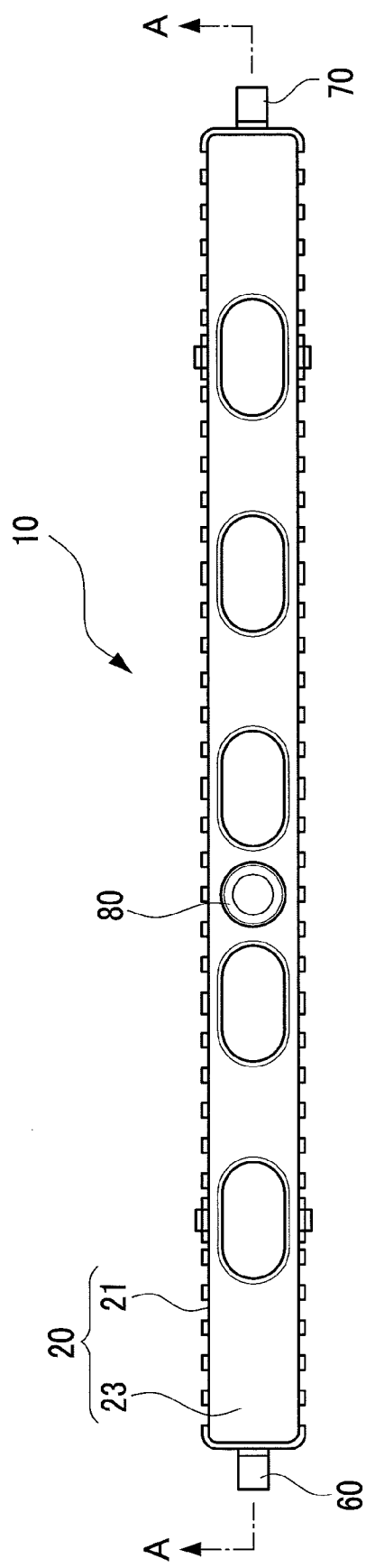
FIG. 1 is a top view of a battery in a first embodiment.
Figure 2:
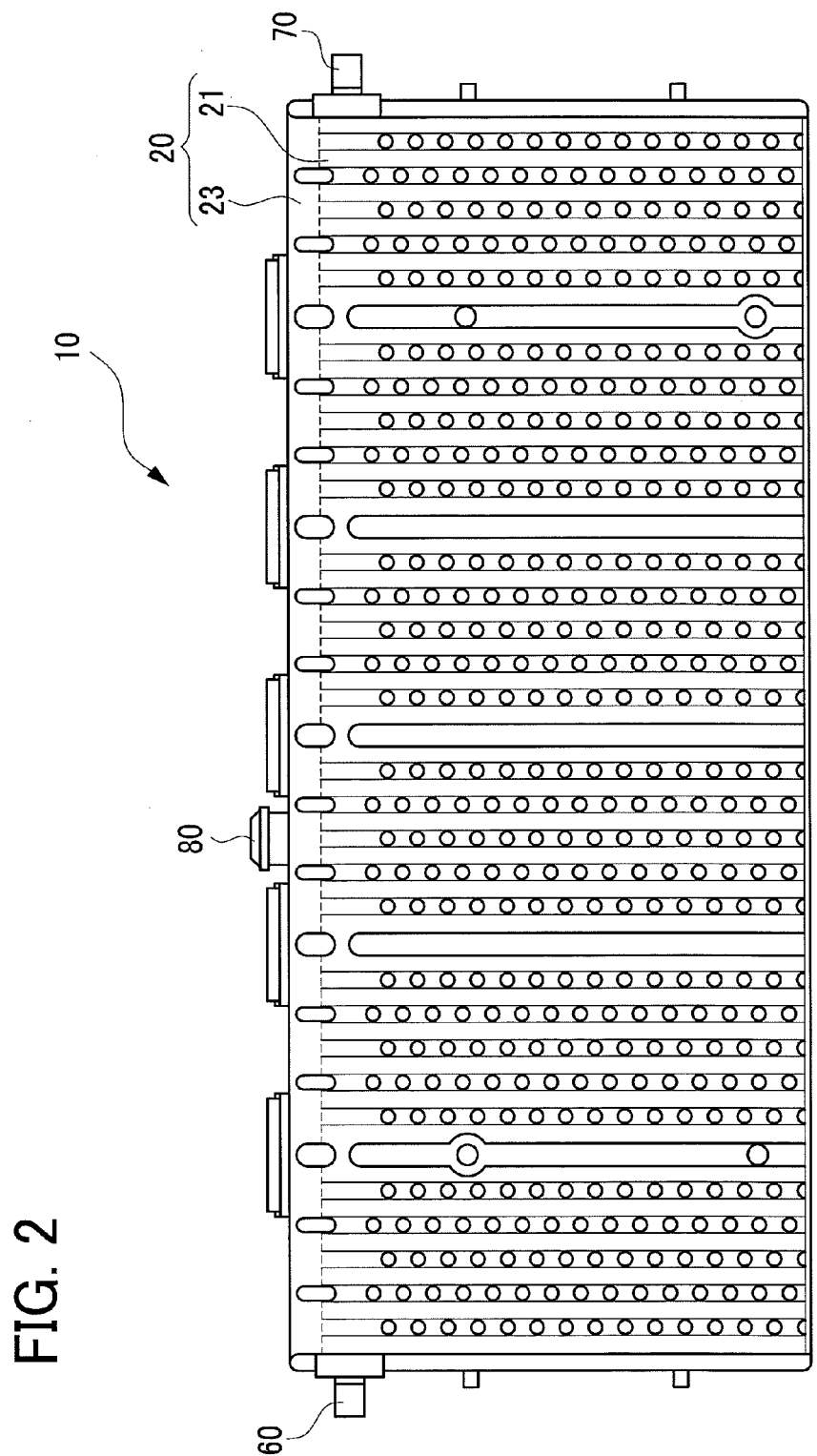
FIG. 2 is a side view of the battery in the first embodiment.
Figure 3:
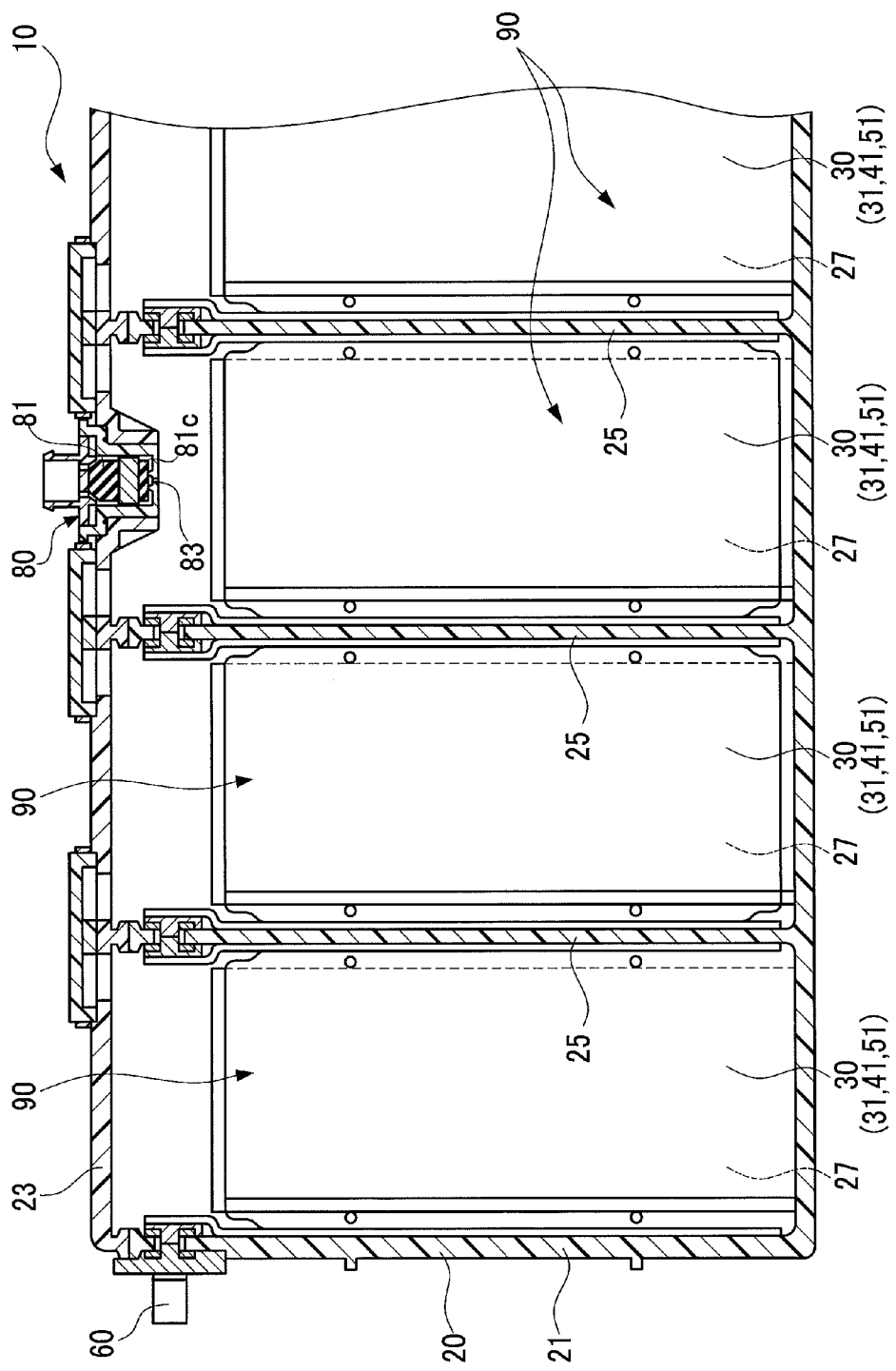
FIG. 3 is a sectional view of the battery taken along A-A in FIG. 1 in the first embodiment.
Figure 4:
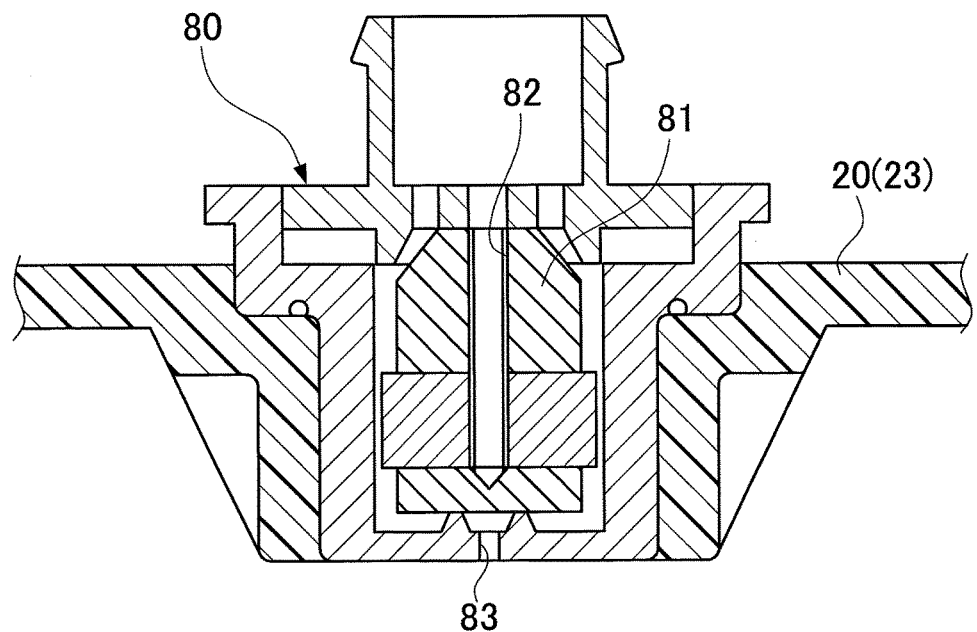
FIG. 4 is an enlarged sectional view of a safety valve device in the first embodiment.
Figure 5:
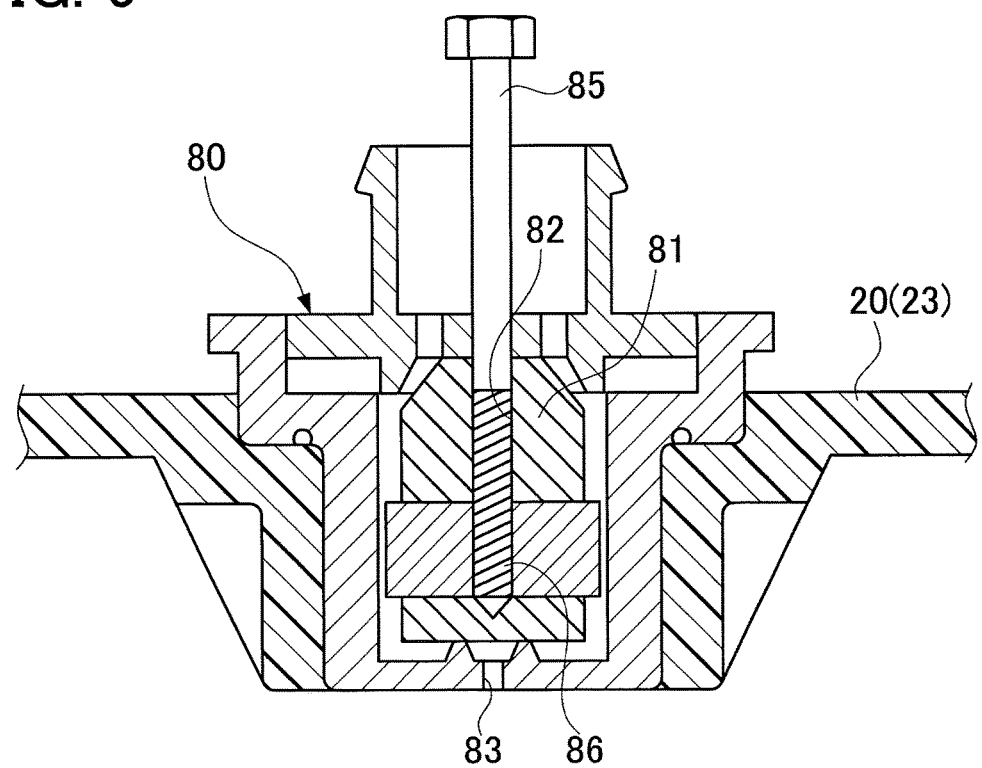
FIG. 5 is an explanatory view showing a state of the safety valve device to which a bolt is fixed in the first embodiment.

A detailed description of embodiments of the present invention will now be given referring to the accompanying drawings. FIGS. 1 to 3 show a nickel-hydride storage battery 10 (hereinafter, also simply referred to as a battery 10) in a first embodiment. FIGS. 4 and 5 show a safety valve device 80 of the battery 10. This battery 10 is a rectangular sealed nickel-hydride storage battery to be mounted in a vehicle such as a hybrid vehicle and an electric vehicle. This battery 10 is also a battery module including a rectangular parallelepiped battery case 20, a plurality of (six) electrode bodies 30 encased in this battery case 20, a positive terminal member 60 and a negative terminal member 70 supported on the battery case 20, and others (see FIGS. 1 to 3).

The battery case 20 is made of resin. This battery case 20 includes a bottom-closed rectangular cylindrical case body 21 having an opening only on an upper side, and a rectangular plate-like lid member 23 closing the opening of the case body 21. The case body 21 is fixedly provided with the positive terminal member 60 and the negative terminal member 70 each extending from inside to outside of the battery case 20. On the other hand, the lid member 23 is provided with a turn-back type safety valve device 80.

Figure 6:
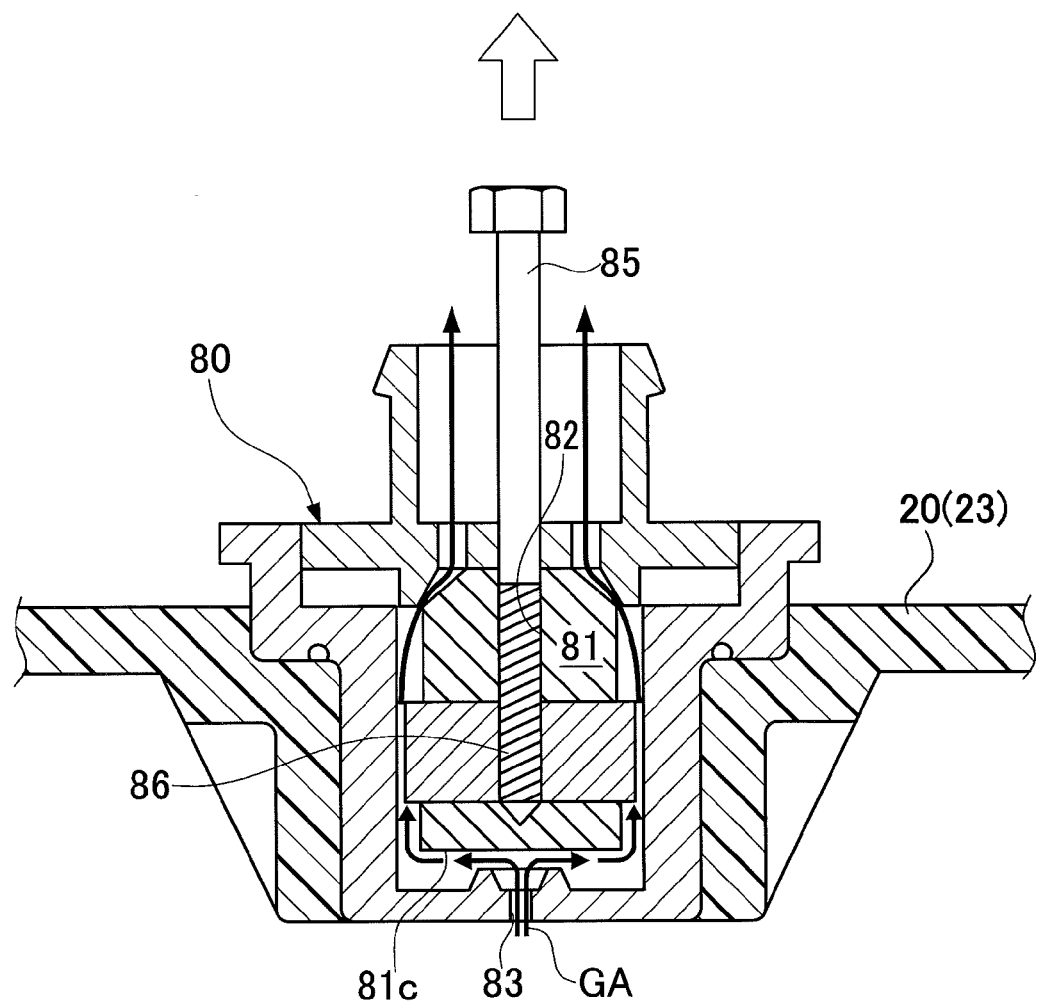
FIG. 6 is an explanatory view showing a state of the safety valve device placed in a valve-open state in the first embodiment.

This safety valve device 80 has a rubber safety valve 81 (see FIGS. 4 and 3). This safety valve 81 keeps a hermetically sealed state of a vent hole 83 communicating inside and outside of the battery case 20 when the battery internal pressure is less than a predetermined valve-opening pressure (concretely, 0.6 MPa). On the other hand, when the battery internal pressure reaches the valve-opening pressure, the safety valve 81 automatically opens, allowing release of gas GA in the battery 10 (the battery case 20) to the outside through the vent hole 83. Particularly, when the battery internal pressure reaches the valve-opening pressure, this pressure pushes up a bottom 81c of the safety valve 81 toward the battery outside, thereby releasing the vent hole 83 from the sealed state (see FIG. 6). Accordingly, the gas GA in the battery 10 is released out of the battery through the vent hole 83.

The safety valve 81 of the safety valve device 80 is formed with a screw hole 82 extending along a central axis of the safety valve 81 and opening toward a battery outer side. Thus, when a screw part 86 provided at a leading end of a bolt 85 is separately threaded into this screw hole 82 as shown in FIG. 5, the bolt 85 can be fixed to the safety valve 81. When the bolt 85 is pulled upward as indicated by an arrow in FIG. 6, the safety valve 81 is lifted up toward the battery outside in a similar manner to when the battery internal pressure reaches the valve-opening pressure, thereby opening the vent hole 83 from the sealed state. That is, the safety valve device 80 can be forcibly valve-opened.

The inside of the battery case 20 is partitioned into six cells 90 by five partition walls 25 (see FIG. 3). In each of the cells 90, respective electrode body 30 is accommodated and also aqueous electrolyte 27 is retained. Each of the electrode bodies 30 is made of positive electrodes 31, negative electrodes 41, and sac-like separators 51. The positive electrodes 31 are inserted one in each of the sac-like separators 51. These positive electrodes 31 set in the separators 51 and the negative electrodes 41 are alternately stacked. The positive electrodes 31 and the negative electrodes 41 located in each cell 90 are individually power-collected and connected in series and also connected to the above-mentioned positive terminal member 60 and the negative terminal member 70 respectively. Each positive electrode 31 is an electrode plate including active material containing nickel hydroxide and active-material carrier made of foamed nickel. Each negative electrode 41 is an electrode plate including hydrogen absorbing alloy as a negative electrode component. The separator 51 is a nonwoven fabric made of synthetic fabric subjected to hydrophilic treatment. The aqueous electrolyte 27 is an alkali solution containing KOH and having a specific gravity of 1.2 to 1.4.

Figure 7:
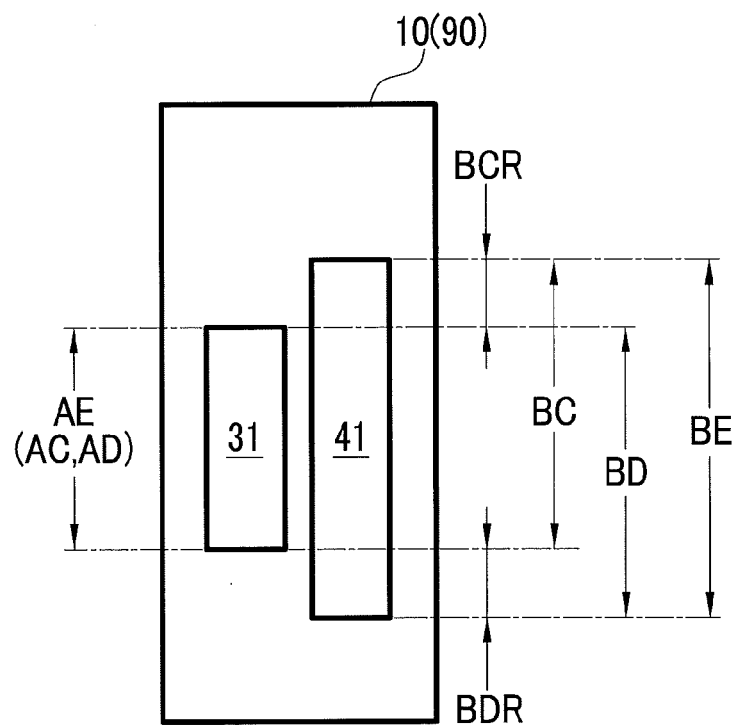
FIG. 7 is an explanatory view showing a relationship between a positive electrode capacity and a negative electrode capacity in a battery at an initial stage in shipping in the first embodiment.

In this battery 10, each cell 90 has a positive electrode capacity AE=6.5 Ah and a negative electrode capacity BE=11.0 Ah (see FIG. 7). FIG. 7 schematically shows a relationship between the positive electrode capacity AE and the negative electrode capacity BE in the battery 10 (each cell 90) at an initial stage in shipping. In this figure, the positive electrode capacity AE and the negative electrode capacity BE are each indicated by the length of a vertically long strip.

This battery 10 is under positive electrode limitation in which each cell 90 has a battery capacity (an initial capacity at the time of shipping) of 6.5 Ah. Specifically, SOC (State of Charge) 100% is 6.5 Ah. Further, a charge capacity AC and a discharge capacity AD of the positive electrode 31 are equal to the positive electrode capacity AE; AC=AD=AE=6.5 Ah. On the other hand, a charge capacity BC of the negative electrode 41 is 8.5 Ah in which a charge reserve capacity BCR is 2.0 Ah. A discharge capacity BD of the negative electrode 41 is 9.0 Ah in which a discharge reserve capacity BDR is 2.5 Ah.

Herein, a method for measuring the discharge reserve capacity BDR of the negative electrode 41 will be explained. A plurality of unused batteries 10 corresponding to those at the initial stage in shipping are firstly prepared. These batteries 10 are discharged until each battery voltage becomes 1.0 V. Then, the aqueous electrolyte 27 is added into each battery 10 so that an amount of the electrolyte 27 becomes excessive. Thereafter, an Hg/HgO reference electrode (not shown) is placed in the electrolyte 27 in each cell 90. Each battery 10 is over-discharged while respective discharge capacity is measured. The discharge reserve capacity BDR of each negative electrode 41 is calculated according to the following expression.

Discharge reserve capacity BDR=(Discharge capacity until a potential of negative electrode 41 with respect to a potential of reference electrode becomes −0.7 V)−(Discharge capacity until a potential of positive electrode 31 with respect to reference electrode becomes −0.5 V)

Consequently, an initial value of the discharge reserve capacity BDR of the negative electrode 41 in each cell 90 averages 2.5 Ah as mentioned above. Because of the positive electrode capacity AE=6.5 Ah, the discharge capacity BD of the negative electrode 41 is determined by BD=6.5+2.5=9.0 Ah. The charge capacity BC of the negative electrode 41 is calculated by BC=11.0−2.5=8.5 Ah and the charge reserve capacity BCR is calculated by BCR=8.5−6.5=2.0 An.

(Production of Battery in Deteriorated State)

Figure 8:
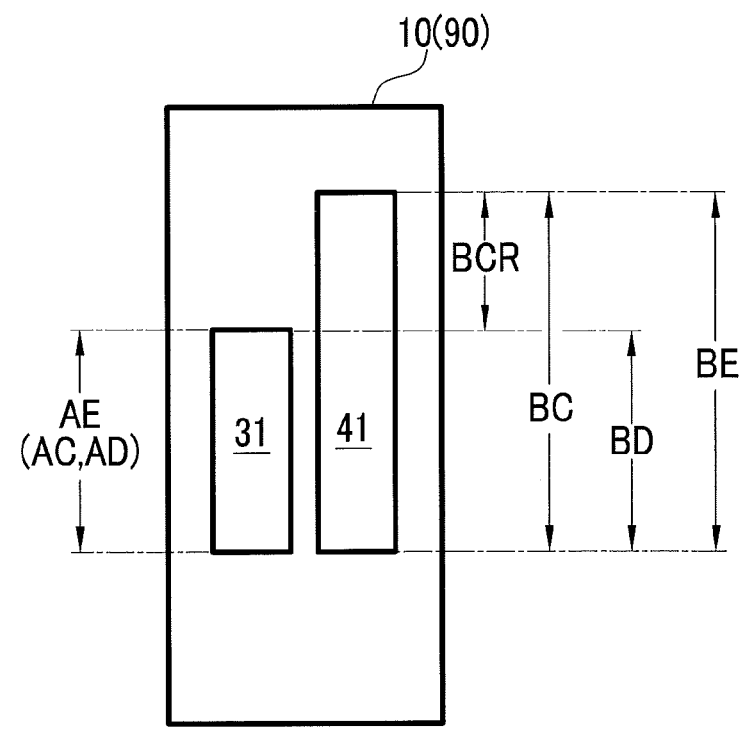
FIG. 8 is an explanatory view showing a relationship between a positive electrode capacity and a negative electrode capacity in a deteriorated battery in the first embodiment.

Next, batteries 10 with forcibly reduced discharge capacities BD of the negative electrodes 41 are produced. To be concrete, a plurality of unused batteries 10 corresponding to batteries at an initial stage in shipping are prepared. The battery cases 20 of these batteries 10 are formed with holes through which oxygen is forcibly injected in the battery cases 20 to reduce the discharge capacity BD of the negative electrodes 41. The holes formed in the battery cases 20 are closed after injection of oxygen. Then, each of the batteries 10 is investigated for the discharge capacity BD of the negative electrode 41 in each cell 90. As a result, the discharge reserve capacity BDR has run out (BDR=zero), and the discharge capacity BD has decreased by 2.5 Ah on average from 9.0 Ah at the initial stage to 6.5 Ah (see FIG. 8).

(Battery Capacity Restoring Test)

A plurality of the batteries 10 (88 batteries) deteriorated as above (the discharge capacity BD of the negative electrode 41 has been reduced) are prepared and they are subjected to a battery capacity restoring test to increase (restore) the discharge capacity BD of the negative electrode 41. To be concrete, each battery 10 is charged, causing generation of oxygen gas from the aqueous electrolyte 27 in each positive electrode 31 and causing valve-opening of the safety valve device 80 to discharge at least part of the generated oxygen gas through the safety valve device 80, thereby increasing the discharge capacity BD of the negative electrode 41.

When the SOC is high to some extent as described later, the batteries 10 when charged develop the following reaction:

(Positive electrode) $OH^- \rightarrow \frac{1}{4}O_2 + \frac{1}{2}H_2O + e^-$  (1)

(Negative electrode) $M + H_2O + e^- \rightarrow MH + OH^-$ 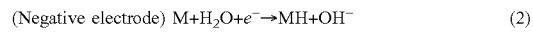 (2)

$MH + \frac{1}{4}O_2 \rightarrow M + \frac{1}{2}H_2O$  (3)

where "M" represents hydrogen absorbing alloy.

Figure 9:
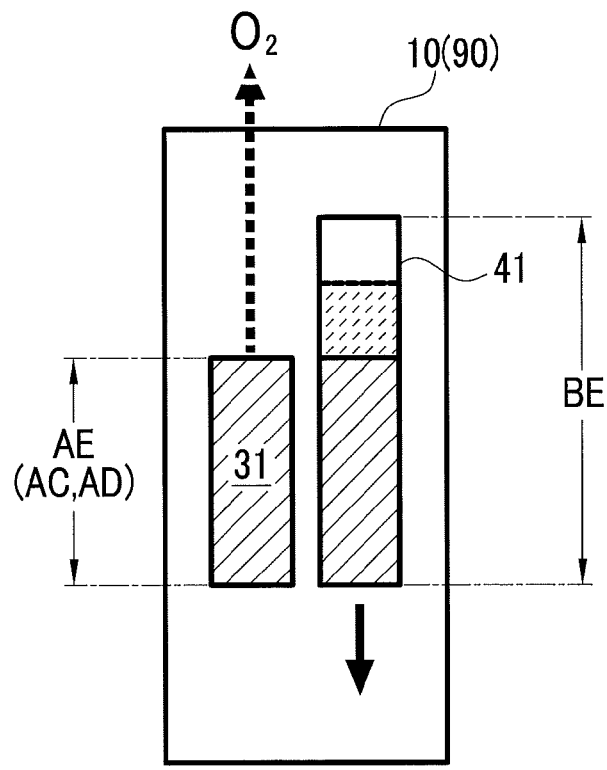
FIG. 9 is an explanatory view showing a relationship between a positive electrode capacity and a negative electrode capacity in the course of capacity restoration in the first embodiment.
Figure 10:
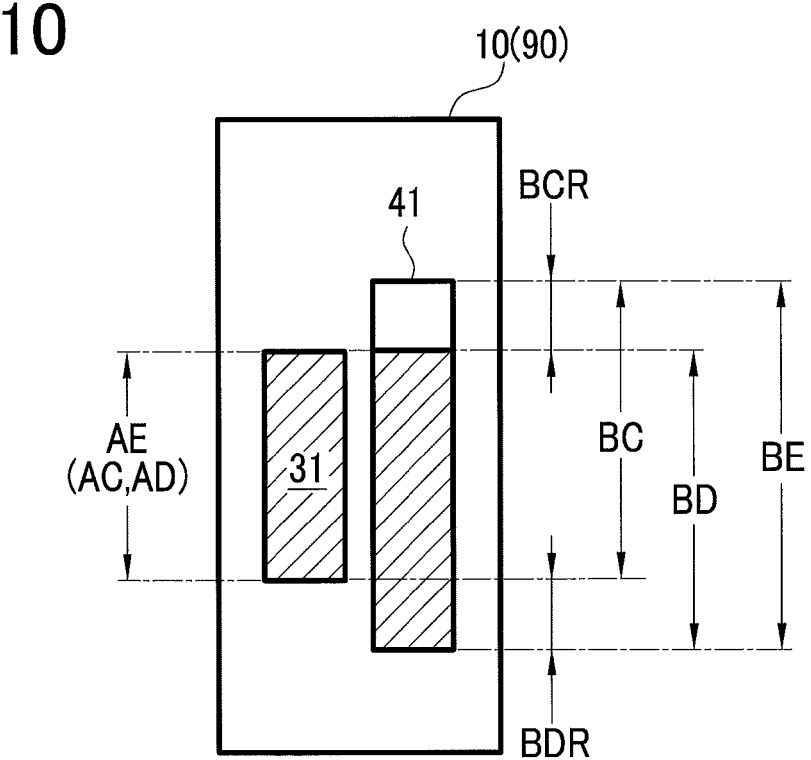
FIG. 10 is an explanatory view showing a relationship between a positive electrode capacity and a negative electrode capacity after capacity restoration in the first embodiment.

When at least part of the oxygen gas $O_2$ generated in the positive electrode 31 in the expression (1) is released out of the battery through the valve-opened safety valve device 80, the reaction of the expression (2) advances in the negative electrode 41, absorbing hydrogen H, but restraining the reaction of the expression (3). This restrains release of hydrogen H. Accordingly, when the batteries 10 are charged, the capacity of a charged portion of each negative electrode 41 increases as schematically illustrated by broken-line hatching in FIG. 9. Thus, the discharge capacity BD of the negative electrode 41 can be increased (see FIG. 10). In FIGS. 9 and 10, the capacity of each charged portion of the positive electrode 31 and the negative electrode 41 is represented by hatching. For instance, until the charge reserve capacity BCR of the negative electrode 41 is produced again. Concretely, until the discharge reserve capacity BDR is restored to 2.5 Ah, the discharge capacity BD is increased by 2.5 Ah from 6.5 Ah to 9.0 Ah.

Figure 11:
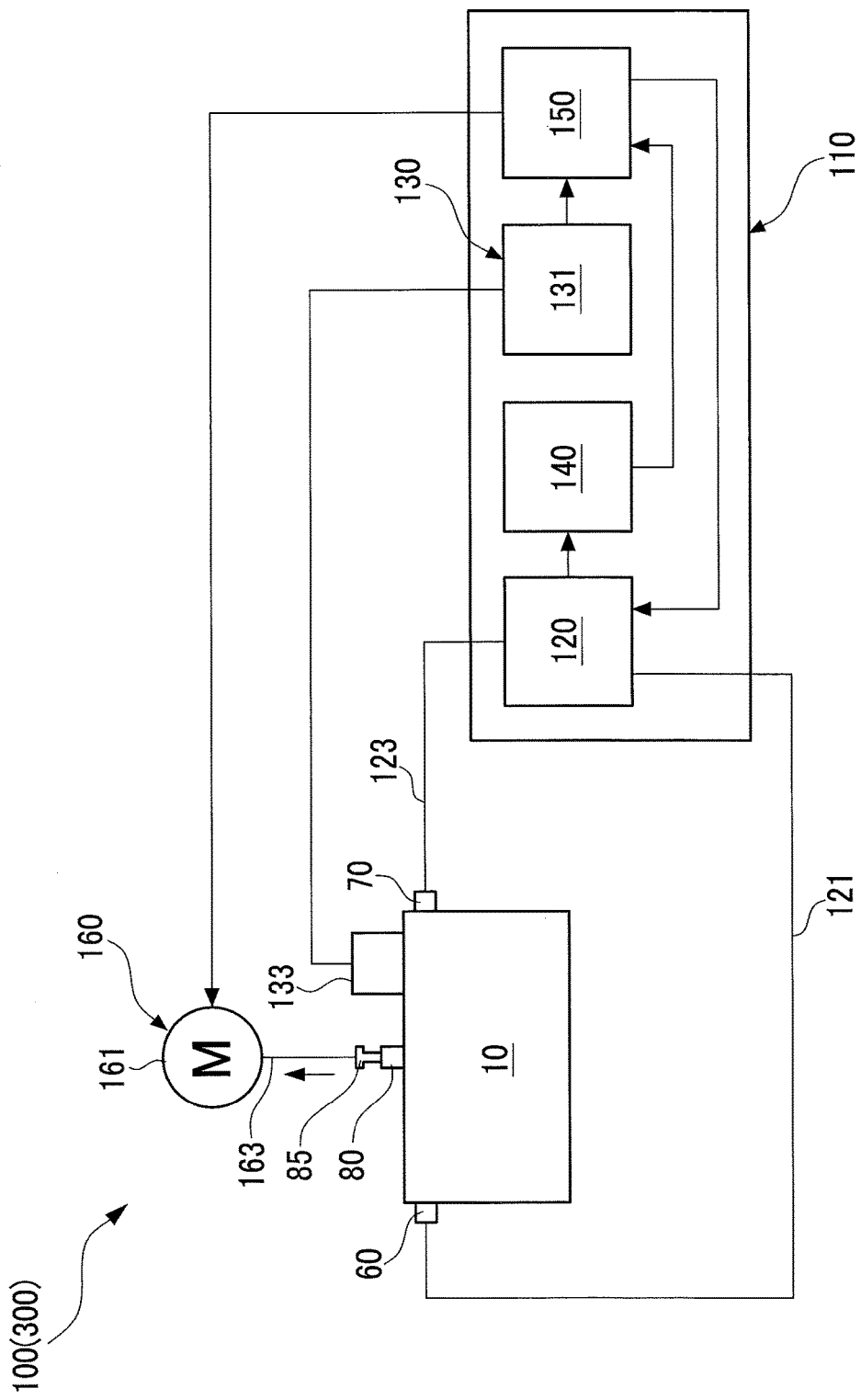
FIG. 11 is an explanatory view showing a device for restoring a battery capacity in the first embodiment.

This battery capacity restoring test was performed using a battery capacity restoring device 100 shown in FIG. 11. This battery capacity restoring device 100 includes a charge-discharge part 120, a temperature detecting part 130, an SOC measuring part 140, a control part 150, and a valve opening part 160. The charge-discharge part 120, a main unit 131 of the temperature detecting part 130, the SOC measuring part 140, and the control part 150 constitute a charge controller 110.

The charge-discharge part 120 is connected to the positive terminal member 60 and the negative terminal member 70 of the battery 10 through connecting cables 121 and 123. Accordingly, this charge-discharge part 120 can charge and discharge each battery 10. This charge-discharge part 120 is configured to measure an electric charge amount of the battery 10 when charged and an electric discharge amount of the battery 10 when discharged. This charge-discharge part 120 corresponds to the above-mentioned "charge part".

The temperature detecting part 130 includes the main unit 131 and a temperature sensor 133 connected thereto. The temperature sensor 133 is attached to the battery 10 and transmits a signal corresponding to the battery temperature Ta to the temperature-detecting-part main unit 131, so that the main unit 131 detects the battery temperature Ta based on that signal. This main unit 131 is further connected to the control part 150 within the charge controller 110 and is able to transmit the information on the battery temperature Ta to the control part 150.

The SOC measuring part 140 calculates a present SOC of the battery 10 based on the electric charge amount and the electric discharge amount of the charge-discharge part 120 subjected to charge and discharge. This SOC measuring part 140 is connected to the control part 150 within the charge control unit 110 and is able to transmit the information on the SOC to the control part 150.

The control part 150 is a microcomputer consisting of a CPU, a ROM, a RAM, and others and being driven by a predetermined program. This control part 150 is connected to the charge-discharge part 120 and thus can control charge of the battery 10 by the charge-discharge part 120. The control part 150 is connected to the valve opening part 160 described later and is able to control valve-opening of the safety valve device 80 by the valve opening part 160.

The valve opening part 160 is a device configured to forcibly open the safety valve device 80 irrespective of whether the battery internal pressure has reached a valve-opening pressure. This valve opening part 160 has a motor 161, a wire 163, and the bolt 85. This bolt 85 is fastened to the screw hole 82 of the safety valve 81 of the safety valve device 80 as described above (see FIGS. 5 and 6). This bolt 85 is connected to the motor 161 through the wire 163 (see FIG. 11). Accordingly, when the motor 161 is driven to pull up the wire 163, the bolt 85 is pulled upward, thereby lifting up the safety valve 81, thus releasing the vent hole 83 from a sealed state. Thus, the safety valve device 80 is forcibly valve-opened. This allows at least part of the oxygen gas generated in the positive electrode 31 due to charge to be released out of the battery through the vent hole 83 of the safety valve device 80.

In this battery capacity restoring test, using the above-mentioned battery capacity restoring device 100, the above-mentioned eighty-eight batteries 10 forcibly deteriorated (with the discharge capacity BD of each negative electrode 41 reduced) are charged to increase the discharge capacity BD of each negative electrode 41 under various conditions of battery temperature and SOC. Specifically, the battery temperature Ta at the start of charging and the battery temperature Ta at the start of valve-opening are changed in a range of −30 to 40° C. at intervals of 10° C. The SOC at the start of charging and the SOC at the start of valve-opening are changed in a range of 0 to 100% at intervals of 10%.

Each of the batteries 10 starts to be charged under any one of the above conditions, generating oxygen gas from the aqueous electrolyte 27 in the positive electrode 31 and valve-opening the safety valve device 80 to release at least part of the generated oxygen gas out of the battery through the safety valve device 80 to increase the discharge capacity BD of the negative electrode 41. In every battery 10, a charge current value is set to a constant current value of 3.0 C and a charge amount is set to 3.85 Ah.

Each of the batteries 10 after the test is subjected to measurement of the discharge capacity BD of the negative electrode 41 and respective capacity increased amounts (Ah) of the discharge capacity BD before and after the test are determined. Respective restoring efficiency (%) to a target restoring amount of the discharge capacity BD is calculated. Concretely, since a battery 10 is charged by the above-mentioned charge amount (3.85 Ah), increasing the discharge capacity BD of the negative electrode 41 by up to 2.5 Ah, the restoring efficiency of a battery 10 is calculated with reference to an increase amount of 2.5 Ah (a target restoring amount: restoring efficiency 100%) of the discharge capacity BD. The target restoring amount (=2.5 Ah) is a discharge capacity to be increased (restored) when each battery 10 is subjected to overcharge corresponding to 3.85 Ah from the condition: battery temperature Ta=25° C. and SOC 100%, and the safety valve device 80 is naturally opened (valve-opening when the battery internal pressure reaches the valve-opening pressure). A result thereof is shown in Table 1. It is to be noted that the battery(s) 10 with the discharge capacity BD of the negative electrode 41 exhibiting a restoring efficiency of 80% or more is evaluated to be especially good (indicated by a mark "○" in Table 1), the battery(s) 10 exhibiting a restoring efficiency of 50 to 80% (indicated by a mark "Δ" in Table 1), and the battery(s) exhibiting a restoring efficiency of less than 50% (indicated by a mark "x" in Table 1).

TABLE 1

| Battery Temperature (° C.) | SOC (%) | | | | | | | | | | |
|---|---|---|---|---|---|---|---|---|---|---|---|
| | 0 | 10 | 20 | 30 | 40 | 50 | 60 | 70 | 80 | 90 | 100 |
| −30 | x | x | x | x | x | x | Δ | ○ | ○ | ○ | ○ |
| −20 | x | x | x | x | x | Δ | ○ | ○ | ○ | ○ | ○ |
| −10 | x | x | x | x | Δ | ○ | ○ | ○ | ○ | ○ | ○ |
| 0 | x | x | x | Δ | ○ | ○ | ○ | ○ | ○ | ○ | ○ |
| 10 | x | x | Δ | ○ | ○ | ○ | ○ | ○ | ○ | ○ | ○ |
| 20 | x | x | Δ | ○ | ○ | ○ | ○ | ○ | ○ | ○ | ○ |
| 30 | x | x | Δ | ○ | ○ | ○ | ○ | ○ | ○ | ○ | ○ |
| 40 | x | x | Δ | ○ | ○ | ○ | ○ | ○ | ○ | ○ | ○ |

As is clear from Table 1, in the battery capacity restoring test, the battery temperatures Ta at the start of charging and at the start of valve-opening are in the range of −30 to 10° C., the SOC falls within a range of (40-Ta) to 100%. The restoring efficiency of the discharge capacity BD of the negative electrode 41 is especially good (the mark ○). When the battery temperature Ta is in the range of 10 to 50° C., the SOC falls within a range of 30 to 100% and thus especially good (the mark ○). Further, when the battery temperature Ta is in the range of −30 to 10° C., the SOC is 30-Ta (%) and thus the restoring efficiency of the discharge capacity BD of the negative electrode 41 is good (the mark A). When the battery temperature Ta is in the range of 10 to 50° C., the restoring efficiency is good (the mark A) even when the SOC is 20%.

In contrast, when the battery temperature Ta is in the range of −30 to 10° C. and the SOC is in the range of 0 to (20-Ta) %, the restoring efficiency of the discharge capacity BD of the negative electrode 41 is not good (the mark x). Furthermore, when the battery temperature Ta is in a range of 10 to 50° C. and the SOC is 0% or 10%, the restoring efficiency is not good (the mark x). These results reveal that when charging and valve-opening are started under the condition that the battery temperature Ta and the SOC at the start of charging and valve-opening is in the range indicated by the mark Δ, further, in the range indicated by the mark ○, a good restoring efficiency of the discharge capacity BD of the negative electrode 41 could be obtained.

(Examples)

A battery capacity restoring method using the battery capacity restoring device 100 in the first embodiment will be explained referring to FIGS. 12 and 13. The battery 10 having the negative electrode 41 whose discharge capacity BD has been reduced as described above is prepared and set in the above-mentioned battery capacity restoring device 100. To be concrete, the positive terminal member 60 and the negative terminal member 70 of the battery 10 are connected to the charge-discharge part 120 of the charge controller 110 through the connecting cables 121 and 123. The temperature sensor 133 is attached to the battery 10 and also connected to the temperature-detecting-part main unit 131 of the charge controller 110. Furthermore, the bolt 85 is attached to the safety valve device 80 of the battery 10 and is connected to the motor 161 through the wire 163.

Figure 12:
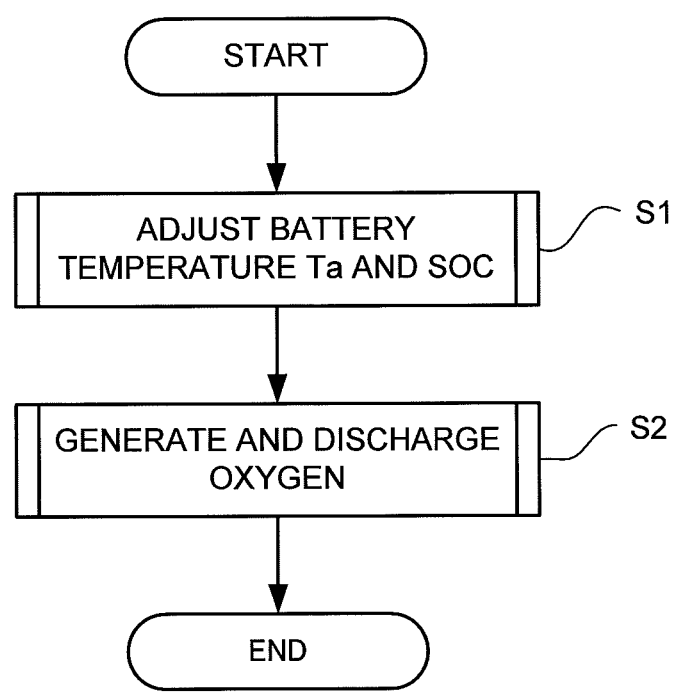
FIG. 12 is a flowchart of a main routine in a battery capacity restoring method in the first embodiment.

In step S1, as shown in FIG. 12, the battery temperature Ta and the SOC of the battery 10 are first adjusted. Specifically, as shown in FIG. 13, a present battery temperature Ta of the battery 10 is first measured in step S11. This battery temperature Ta is measured by the temperature sensor 133 attached to the battery 10 as described above and detected by the temperature-detecting-part main unit 131 in the charge controller 110. In step S12, subsequently, a present SOC of the battery 10 is measured. This SOC is obtained by calculation in the SOC measuring part 140 of the charge controller 110 as described above.

In step S13, it is then determined whether or not the battery temperature Ta and the SOC obtained in steps S11 and S12 meet a predetermined initiation condition. In the present embodiment, this starting condition is defined as that the battery temperature Ta is in the range of −30 to 10° C. and the SOC is in the range of (40-Ta) to 100%, or, that the battery temperature Ta is in the range of 10 to 50° C. and the SOC is in the range of 30 to 100%.

When NO (the starting condition is not satisfied) is obtained in step S13, the flow advances to step S14. In step S14, the battery temperature Ta of the battery 10 is adjusted. In the present embodiment, concretely, this capacity restoring method is performed in an environment with a temperature of 20° C. and therefore the battery temperature Ta comes close to 20° C. as the time passes after the battery is left standing. In step S15, successively, the SOC of the battery 10 is adjusted. Specifically, the battery 10 is charged or discharged by the charge-discharge part 120 to adjust the SOC of the battery 10 into the above-described range. Thereafter, the flow returns to step S11.

On the other hand, when YES (the starting condition is satisfied) is determined in step S13, an oxygen generating and exhausting step in step S2 is performed (see FIG. 12). In this step S2, the battery 10 is charged, generating oxygen gas from the aqueous electrolyte 27 in the positive electrode 31 and also the safety valve device 80 is valve-opened to release at least part of the generated oxygen gas out of the battery through the safety valve device 80.

Figure 13:
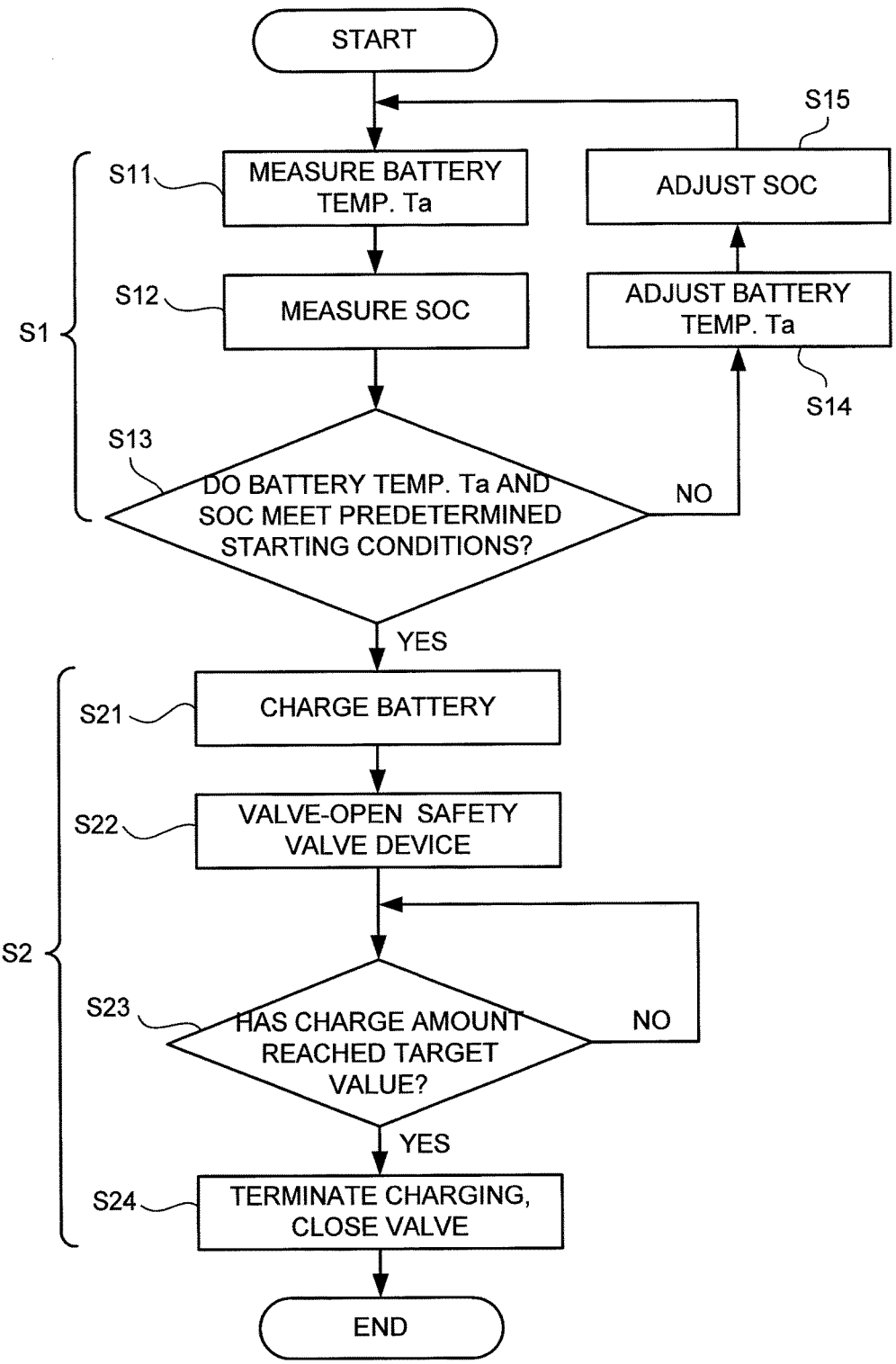
FIG. 13 is a flowchart of a sub routine in the battery capacity restoring method in the first embodiment.

Specifically, in step S21 shown in FIG. 13, the battery is charged by the charge-discharge part 120. When the battery 10 is subjected to charging in the above step S15 for adjustment of the SOC, the charging is performed successively in this step S21. On the other hand, when step S15 is not performed or when the battery 10 is discharged in step S15, charging is started in this step S21. In the present example, a charge current value is set to a constant current value, 3.0 C.

In step S22, subsequently, the safety valve device 80 of the battery 10 is forcibly valve-opened by the valve opening part 160. Concretely, the motor 161 of the valve opening part 160 is driven to lift up the safety valve 81 through the wire 163 and the bolt 85, thereby releasing the sealed state of the vent hole 83 and bringing the safety valve device 80 in a valve-opened state.

In step S23, it is determined whether or not a present charge amount after the start of charging in step S21 has reached a target charge value (e.g., 3.85 Ah). This target charge value=3.85 Ah is a charge amount that can be increased from a present BD=6.5 Ah to BD=9.0 Ah by increasing the discharge capacity BD by up to 2.5 Ah. Herein, when YES, i.e., it is determined that the present charge amount has reached the target charge value, the flow advances to step S24 in which charging is terminated and the safety valve device 80 is valve-closed. On the other hand, when NO, i.e., it is determined that the present charge amount does not reach the target charge value, the charging is continued. This can increase (restore) the discharge capacity BD of the negative electrode 41 by a desired capacity.

In the battery capacity restoring method, as explained above, by use of the battery capacity restoring device 100, the battery temperature Ta is set to fall within the range of −30 to 10° C. and the SOC is set to fall within the range of (30-Ta) to 100(%), and then the oxygen generating and exhausting step S2 is started to increase the discharge capacity BD of the negative electrode 41. Alternatively, the battery temperature Ta is set to fall within the range of 10 to 50° C. and the SOC is set to fall within the range of 20 to 100(%), and then the oxygen generating and exhausting step S2 is started to increase the discharge capacity BD of the negative electrode 41.

Since the charging is started from a state with the SOC 100% or less to restore the discharge capacity BD of the negative electrode 41, the SOC value can be made low when the discharge capacity BD of the negative electrode 41 is increased to the target value. This can eliminate or reduce damages to the battery 10 due to overcharge. On the other hand, for the battery temperature Ta falling within −30 to 10° C., the charging is started under the condition that the SOC is in the range of 30-Ta (%) or more, For the battery temperature Ta falling within 10 to 50° C., alternatively, the charging is started under the condition that the SOC is in the range of 20% or more. After the start of charging, accordingly, it is possible to reliably generate oxygen gas in the positive electrode 31 and cause the hydrogen absorbing alloy of the negative electrode 41 to absorb hydrogen. Since the charging is started in the above range and the safety valve device 80 is continuously valve-opened to release the generated oxygen gas out of the battery, it is possible to restrain the recombination reaction and allow the hydrogen absorbing alloy of the negative electrode 41 to absorb hydrogen. Thus, the discharge capacity BD of the negative electrode 41 can be efficiently restored.

In particular, when the oxygen generating and exhausting step S2 is started in the range of SOC=40-Ta (%) for the battery temperature Ta falling within the range of −30 to 10° C. or in the range of SOC 30% or more for the battery temperature Ta falling within the range of 10 to 50° C., the positive electrode 31 charged can generate oxygen gas more efficiently after the start of charging and the amount of hydrogen to be absorbed by the hydrogen absorbing alloy of the negative electrode 41 can be increased. Accordingly, when the charging is started in this range and the safety valve device 80 is continuously valve-opened to release the generated oxygen gas out of the battery, more hydrogen can be absorbed by the hydrogen absorbing alloy of the negative electrode 41, resulting in further efficient restoration of the discharge capacity BD of the negative electrode 41.

Second Embodiment

A second embodiment will be explained below. A battery-pack capacity restoring method in the second embodiment configured to increase the discharge capacity BD of the negative electrode 41 in each of batteries 10 constituting a battery pack 200 is different from the battery capacity restoring method in the first embodiment configured to increase the discharge capacity of the negative electrode 41 in one battery 10. A battery-pack capacity restoring device 300 in the second embodiment including a cooling device 310 and a heating device 320 is different from the battery capacity restoring device 100 in the first embodiment. Remaining parts are similar to those in the first embodiment and such similar parts to those in the first embodiment are not explained or are explained briefly.

Figure 14:
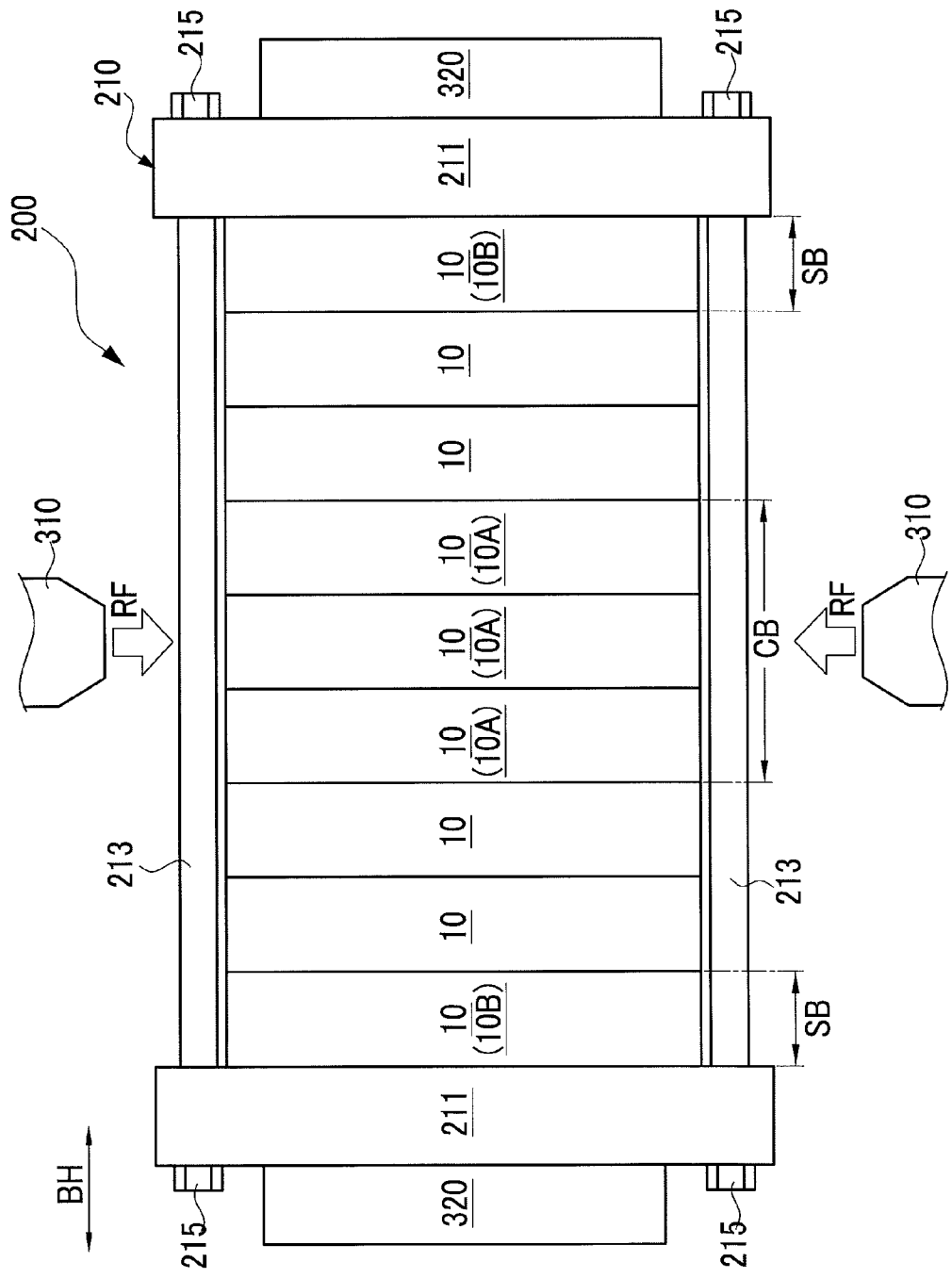
FIG. 14 is an explanatory view of a battery pack in a second embodiment.

The battery pack 200 having a plurality of the above-mentioned batteries 10 will be first explained (see FIG. 14). This battery pack 200 includes a plurality of the batteries 10 arranged in a row in a row direction BH and a binding member 210 for binding up the batteries 10 while pressing against them. In FIG. 14, the positive terminal member 60 and the negative terminal member 70 of each battery 10 are omitted.

The plurality of batteries 10 are arranged in a row in a battery thickness direction (the row direction BH) and the adjacent ones 10 are electrically connected in series to each other through a bus bar not shown. The binding member 210 includes a pair of end plates 211, four binding rods 213, and eight nuts 215. The end plates 211 each have a rectangular plate-like shape and are placed on both sides of the batteries 10 arranged in a row. Each of the binding rods 213 has male threads at both ends. The rods 213 are placed to extend between the pair of end plates 211, 211 and fastened between the end plates 211, 211 with the nuts 215.

The battery-pack capacity restoring device 300 in the second embodiment will be explained below. This battery-pack capacity restoring device 300 includes the cooling devices 310 and the heating devices 320 (see FIG. 14) in addition to the battery capacity restoring device 100 (see FIG. 11) in the first embodiment. These cooling devices 310 and heating devices 320 are connected to the charge controller 110 and will be controlled by the charge controller 110.

The cooling devices 310 are air blowers configured to blow cold air RF against the batteries 10 and placed above and below the center of the battery pack 200 in the row direction BH. Accordingly, the cooling devices 310 can cool a plurality of batteries 10 (batteries 10A) placed in a central region among the batteries 10 constituting the battery pack 200. The heating devices 320 are heaters and are placed outside the battery pack 200 in the row direction BH, i.e., outside of and in contact with the end plates 211, 211 respectively. Thus, the heating devices 320 can heat a plurality of batteries 10 (batteries 10B) placed in outer regions SB among the batteries 10 constituting the battery pack 200.

Next, a battery-pack capacity restoring method using the above battery-pack capacity restoring device 300 will be explained below. Firstly, the battery pack 200 including the batteries 10 each having the negative electrode 41 whose discharge capacity BD has been reduced as described above is prepared and set in the capacity restoring device 300. Since this battery pack 200 is detached from a vehicle in which the battery pack 200 has been mounted, the batteries 10A located in the central region CB are high in temperature. On the other hand, the batteries 10B located in the outer regions SB are likely to be cooled by heat release and made low in temperature.

Therefore, in step S1, as in the first embodiment (see FIG. 12), the battery temperature Ta and the SOC of each battery 10 constituting the battery pack 200 are adjusted. To be concrete, the batteries 10A located in the central region CB are cooled by the cooling devices 310 and also the batteries 10B located in the outer regions SB are heated by the heating devices 320 to adjust the battery temperature Ta of each battery 10 of the battery pack 200 including the batteries 10A and 10B into a range of 20 to 40° C. Further, the battery pack 200 is charged or discharged to adjust each battery 10 of the battery pack 200 to have SOC 30%.

Successively, as in the first embodiment (see FIG. 13), the oxygen generating and exhausting step S2 is performed. In the second embodiment, however, even this oxygen generating and exhausting step S2 is also performed while the cooling devices 310 cool the batteries 10A located in the central region CB of the battery pack 200 and the heating devices 320 heat the batteries 10B located in the outer regions SB of the battery pack 200. Thus, the discharge capacity BD of the negative electrode 41 of each battery 10 constituting the battery pack 200 can be increased (restored) by a desired capacity.

Out of the batteries 10 of the battery pack 200, the batteries 10A placed in the central region CB are less likely to dissipate heat and the batteries 10B placed in the outer regions SB are more likely to dissipate heat. This causes variations in battery temperature among the batteries 10 of the battery pack 200. When the battery temperature varies as above, even when the batteries 10 start to be subjected to charging and valve-opening at the same timing, the restoring amount of the discharge capacity BD of the negative electrode 41 is different from battery to battery. If the battery temperature rises too high, the batteries 10 may be damaged by heat.

In contrast, the battery-pack capacity restoring method using the battery-pack capacity restoring device 300 is performed by cooling the batteries 10A placed in the central region CB among the plurality of batteries 10 constituting the battery pack 200 and also heating the batteries 10B placed in the outer regions SB among the plurality of batteries 10 constituting the battery pack 200 to restore the discharge capacity BD of the negative electrodes 41. This manner can suppress variation in battery temperature among the batteries 10, thereby enabling reducing variation in restoring amount of the discharge capacity BD of the negative electrodes 41 among the batteries 10. It is further possible to prevent damages to the batteries 10 due to high temperature.

The present invention is explained above in the embodiments, but is not limited to the above-mentioned first and second embodiments. The present invention may be embodied in other specific forms without departing from the essential characteristics thereof. In the first and second embodiments, for instance, the batteries 10 including the resin battery cases 20 are targeted to increase (restore) the discharge capacity BD of the negative electrode 41. Another nickel-hydride storage battery including a battery case made of a material different from resin can also be targeted to increase a discharge capacity BD of a negative electrode.

In the first embodiment, in step S1, the battery temperature Ta of the battery 10 is adjusted to a battery temperature Ta of 20° C. and the SOC is adjusted to a SOC 30%. In the second embodiment, in step S1, the battery temperature Ta of each battery 10 constituting the battery pack 200 is adjusted to a range of 20 to 40° C. and the SOC is adjusted to a SOC 30%. However, the invention is not limited to the above. When the battery temperature Ta is adjusted to a range of −30 to 10° C., the SOC has only to be adjusted to a range of (30-Ta) to 100%. When the battery temperature Ta is adjusted to a range of 10 to 50° C., the SOC has only to be adjusted to a range of 20 to 100%. Furthermore, when the battery temperature Ta is adjusted to a range of −30 to 10° C., the SOC is more preferably adjusted to a range of (40-Ta) to 100%. When the battery temperature Ta is adjusted to a range of 10 to 50° C., the SOC is more preferably adjusted to a range of 30 to 100%. In this way, an optimum SOC at which valve-opening should be performed is determined for each battery 10. Accordingly, for example, even when the discharge capacity BD of the negative electrode 41 of the battery 10 mounted in a vehicle is desired to be restored in a place difficult to adjust a temperature condition (such as outdoors), the SOC requiring valve-opening is determined. Thus, the discharge capacity BD can be suitably restored.

Furthermore, the termination of charging and the termination of valve-opening of the battery(s) 10 can also be changed appropriately. The first and second embodiments show the examples where charging and valve-opening are performed until the discharge reserve capacity BDR is produced again in the negative electrode 41, concretely, until the discharge reserve capacity BDR that was zero before restoration is restored to an original BDR=2.5 Ah to increase the discharge capacity BD by 2.5 Ah from the previous BD=6.5 Ah before restoration up to BD=9.0 Ah. The invention is however not limited thereto. For example, even though restoration is not sufficient but the discharge capacity BD may be increased by 2.0 Ah from the previous BD=6.5 Ah obtained before restoration to restore to 8.5 Ah lower than the BD=9.0 Ah obtained at the initial stage in shipping.

In the first and second embodiments, the battery(s) 10 in which the discharge capacity BD of the negative electrodes 41 has been reduced due to deterioration until the discharge reserve capacity BDR has just run out is subjected to increase (restore) the discharge capacity BD of the negative electrodes 41. The invention is however not limited thereto. For instance, even though the discharge capacity BD of the negative electrodes 41 decreases than that at the initial stage in shipping, the battery in which the discharge reserve capacity BDR is still left and the battery having the discharge reserve capacity BDR turned to zero and further being subjected under negative electrode limitation are targeted to increase (restoration) of the discharge capacity BD of the negative electrodes 41.

REFERENCE SIGNS LIST 10, 10A, 10B Battery (Nickel-hydride storage battery)
20 Battery case
27 Aqueous electrolyte
30 Electrode body
31 Positive electrode
41 Negative electrode
80 Safety valve device
90 Cell
100 Battery capacity restoring device
110 Charge controller
120 Charge-discharge part (Charge part)
130 Temperature detecting part
140 SOC measuring part
150 Control part
160 Valve opening part
200 Battery pack
300 Battery-pack capacity restoring device
310 Cooling device
320 Heating device
AE Positive electrode capacity
AC Charge capacity (of Positive electrode)
AD Discharge capacity (of Positive electrode)
BE Negative electrode capacity
BC Charge capacity (of Negative electrode)
BCR Charge reserve capacity
BD Discharge capacity (of Negative electrode)
BDR Discharge reserve capacity
GA Gas
CB Central region
SB Outer region
Ta Battery temperature

The invention claimed is:

1. A method for restoring a battery capacity of at least one nickel-hydride storage battery including a positive electrode, a negative electrode, a turn-back type safety valve device, an aqueous electrolyte by increasing a discharge capacity of the negative electrode, the method including:

an oxygen generating and exhausting step of charging the at least one nickel-hydride storage battery to generate oxygen gas from the aqueous electrolyte in the positive electrode and bringing the safety valve device in a valve-open state to release at least part of the generated oxygen gas out of the battery through the safety valve device, wherein a battery temperature Ta of the at least one nickel-hydride storage battery at start of the oxygen generating and exhausting step is in a range of −30 to 10° C. and an SOC at the start is in a range of (30-Ta) to 100%, or, the battery temperature Ta of the at least one nickel-hydride storage battery at the start is in a range of 10 to 50° C. and the SOC is in a range of 20 to 100%.

2. The method for restoring a battery capacity according to claim 1, wherein the battery temperature Ta of the at least one nickel-hydride storage battery at the start of the oxygen generating and exhausting step is in the range of −30 to 10° C. and the SOC at the start is in a range of (40-Ta) to 100%, or, the battery temperature Ta of the at least one nickel-hydride storage battery at the start is in the range of 10 to 50° C. and the SOC at the start is in a range of 30 to 100%.

3. A method for restoring a battery-pack capacity of a battery pack including a plurality of the nickel-hydride storage batteries by performing the battery capacity restoring method set forth in claim 1 on each of the plurality of nickel-hydride storage batteries, wherein the oxygen generating and exhausting step is performed while at least either cooling one or multiple nickel-hydride storage batteries placed in a central region, out of the plurality of nickel-hydride storage batteries constituting the battery pack, or heating one or multiple nickel-hydride storage batteries placed in outer regions, out of the plurality of nickel-hydride storage batteries constituting the battery pack.

4. A device for restoring a battery capacity of at least one nickel-hydride storage battery including a positive electrode, a negative electrode, a turn-back type safety valve device, and an aqueous electrolyte by increasing a discharge capacity of the negative electrode, the device including:

a charge part configured to charge the at least one nickel-hydride storage battery to generate oxygen gas from the aqueous electrolyte in the positive electrode;

a valve opening part configured to valve-open the safety valve device of the at least one nickel-hydride storage battery;

a temperature detecting part configured to detect a battery temperature Ta of the at least one nickel-hydride storage battery;

a SOC measuring part configured to measure SOC of the at least one nickel-hydride storage battery; and a controller configured to control charging by the charge part and valve-opening by the valve opening part based on the battery temperature and the SOC of the at least one nickel-hydride storage battery, wherein the controller is configured to cause the charge part to charge the at least one nickel-hydride storage battery and cause the valve opening part to bring the safety valve device in a valve-open state under a starting condition that the battery temperature Ta detected by the temperature detecting part is in a range of −30 to 10° C. and the SOC measured by the SOC measuring part is in a range of (30-Ta) to 100%, or, cause the charge part to charge the at least one nickel-hydride storage battery and cause the valve opening part to bring the safety valve device in a valve-open state under a starting condition that the battery temperature Ta is in a range of 10 to 50° C. and the SOC is in a range of 20 to 100%.

5. The device for restoring a battery capacity according to claim 4, wherein the controller is configured to cause the charge part to charge the at least one nickel-hydride storage battery and cause the valve opening part to bring the safety valve device in the valve-open state under a starting condition that the battery temperature Ta is in the range of −30 to 10° C. and the SOC is in a range of (40-Ta) to 100%, or, cause the charge part to charge the at least one nickel-hydride storage battery and cause the valve opening part to bring the safety valve device in the valve-open state under a starting condition that the battery temperature Ta is in the range of 10 to 50° C. and the SOC is in a range of 30 to 100%.

6. A device for restoring a battery-pack capacity of a battery pack including a plurality of the nickel-hydride storage batteries by increasing a discharge capacity of the negative electrode of each of the plurality of nickel-hydride storage batteries, the device including:

the battery capacity restoring device according to claim 4; and at least one of a cooling device for cooling one or multiple nickel-hydride storage batteries placed in a central region, out of the plurality of nickel-hydride storage batteries constituting the battery pack and a heating device for heating one or multiple nickel-hydride storage batteries placed in outer regions, out of the plurality of nickel-hydride storage batteries constituting the battery pack.

7. A method for restoring a battery-pack capacity of a battery pack including a plurality of the nickel-hydride storage batteries by performing the battery capacity restoring method set forth in claim 2 on each of the plurality of nickel-hydride storage batteries, wherein the oxygen generating and exhausting step is performed while at least either cooling one or multiple nickel-hydride storage batteries placed in a central region, out of the plurality of nickel-hydride storage batteries constituting the battery pack, or heating one or multiple nickel-hydride storage batteries placed in outer regions, out of the plurality of nickel-hydride storage batteries constituting the battery pack.

8. A device for restoring a battery-pack capacity of a battery pack including a plurality of the nickel-hydride storage batteries by increasing a discharge capacity of the negative electrode of each of the plurality of nickel-hydride storage batteries, the device including:

the battery capacity restoring device according to claim 5; and at least one of a cooling device for cooling one or multiple nickel-hydride storage batteries placed in a central region, out of the plurality of nickel-hydride storage batteries constituting the battery pack and a heating device for heating one or multiple nickel-hydride storage batteries placed in outer regions, out of the plurality of nickel-hydride storage batteries constituting the battery pack.

* * * * *